United States Patent
Peterson et al.

(10) Patent No.: US 10,277,879 B2
(45) Date of Patent: Apr. 30, 2019

(54) 3D SYSTEM INCLUDING RENDERING WITH EYE DISPLACEMENT

(71) Applicant: VEFXi Corporation, North Plains, OR (US)

(72) Inventors: Craig Peterson, North Plains, OR (US); Markus Roberts, North Plains, OR (US); Sergey Lomov, North Plains, OR (US); Manuel Muro, North Plains, OR (US)

(73) Assignee: VEFXi Corporation, North Plains, OR (US)

( * ) Notice: Subject to any disclaimer, the term of this patent is extended or adjusted under 35 U.S.C. 154(b) by 18 days.

(21) Appl. No.: 15/293,433

(22) Filed: Oct. 14, 2016

(65) Prior Publication Data

US 2017/0142398 A1    May 18, 2017

Related U.S. Application Data

(60) Provisional application No. 62/255,132, filed on Nov. 13, 2015.

(51) Int. Cl.
| | |
|---|---|
| G02B 27/01 | (2006.01) |
| G02B 27/10 | (2006.01) |
| H04N 13/261 | (2018.01) |
| H04N 13/128 | (2018.01) |
| G06T 7/593 | (2017.01) |
| G06T 7/11 | (2017.01) |
| G06T 7/00 | (2017.01) |
| G06T 7/579 | (2017.01) |
| H04N 13/00 | (2018.01) |

(52) U.S. Cl.
CPC .......... H04N 13/128 (2018.05); G06T 7/579 (2017.01); G06T 7/97 (2017.01); H04N 13/261 (2018.05); *G06T 2207/10016* (2013.01); *H04N 2013/0081* (2013.01)

(58) Field of Classification Search
CPC ......... H04N 13/00; H04N 13/02; G06T 15/00
USPC ....................................................... 348/43
See application file for complete search history.

(56) References Cited

U.S. PATENT DOCUMENTS

| | | | |
|---|---|---|---|
| 6,020,931 A | 2/2000 | Bilbrey et al. | |
| 7,161,614 B1 | 1/2007 | Yamashita et al. | |
| 2006/0078180 A1 | 4/2006 | Berretty | |
| 2008/0281767 A1 | 11/2008 | Garner | |
| 2010/0165081 A1 | 7/2010 | Jung et al. | |
| 2010/0245548 A1 | 9/2010 | Sasaki et al. | |
| 2011/0134109 A1* | 6/2011 | Izumi | G06T 15/205 345/419 |
| 2012/0069019 A1 | 3/2012 | Richards | |

(Continued)

FOREIGN PATENT DOCUMENTS

| | | |
|---|---|---|
| WO | 2013109252 A1 | 7/2013 |
| WO | 2015026017 A1 | 2/2015 |

OTHER PUBLICATIONS

Tech, G., Wegner, K., Chen, Y. & Yea, S. (Apr. 2013). "3D-HEVC Test Model 4", JCT3V-D1005—4th Meeting: Incheon, KR, Apr. 20-26, 2013.*

(Continued)

*Primary Examiner* — Patricia I Young
(74) *Attorney, Agent, or Firm* — Chernoff, Vilhauer, McClung & Stenzel, LLP

(57) ABSTRACT

A three dimensional system including rendering with eye displacement.

1 Claim, 20 Drawing Sheets

(56) References Cited

U.S. PATENT DOCUMENTS

| | | |
|---|---|---|
| 2012/0229519 A1 | 9/2012 | Stallings et al. |
| 2012/0256096 A1 | 10/2012 | Heimlicher et al. |
| 2013/0027390 A1 | 1/2013 | Kim et al. |
| 2013/0038611 A1 | 2/2013 | Noritake et al. |
| 2013/0102249 A1 | 4/2013 | Tanaka |
| 2014/0035902 A1 | 2/2014 | An et al. |
| 2014/0304310 A1 | 10/2014 | Gerbasi |
| 2015/0232065 A1 | 8/2015 | Ricci et al. |
| 2015/0341616 A1 | 11/2015 | Siegel et al. |

OTHER PUBLICATIONS

International Search Report and Written Opinion, PCT International Patent Application No. PCT/US2016/061313, Craig Peterson, dated Jan. 19, 2017, 22 pages.

International Bureau of WIPO; International Preliminary Report on Patentability, dated Aug. 30, 2018, for PCT App. No. PCT/US2017/016240 filed Feb. 2, 2017; 8 pages.

International Preliminary Report on Patentability, dated May 15, 2018, PCT International App. No. PCT/US2016/061313, filed Nov. 10, 2016, Craig Peterson, Applicant, 19 pgs.

* cited by examiner

3D SYSTEM INCLUDING RENDERING WITH EYE DISPLACEMENT

CROSS-REFERENCE TO RELATED APPLICATIONS

This application claims the benefit of U.S. Provisional App. No. 62/255,132, filed Nov. 13, 2015.

BACKGROUND OF THE INVENTION

Two dimensional video content, such as obtained with a video camera having a single aperture, is often either projected onto a display screen for viewing or viewed on a display designed for presenting two dimensional content. Over time, the resolution of displays has tended to increase, from standard television interlaced content resolution (e.g., 480i), to high definition television content (e.g., 1080i), to 4K definition television content (4K UHD), and even to even higher definition television content (e.g., 8K UHD). Such increases in video resolution technology only provide for limited increases in the apparent image entertainment to the viewer. Accordingly, the viewer is only immersed in the video experience to a limited extent.

To increase the immersive experience of the viewer it is desirable to effectively convert two dimensional image content into three dimensional (3D) image content, including glasses-free and glasses-based three dimensional content, which is thereafter displayed on a suitable display for viewing three dimensional image content. The perception of three dimensional content may involve a third dimension of depth, which may be perceived in a form of binocular disparity by the human visual system. Since the left and the right eyes of the viewer are at different positions, each eye perceives a slightly different view of a field of view. The human brain may then reconstruct the depth information from these different views to perceive a three dimensional view. To emulate this phenomenon, a three dimensional display may display two or more slightly different images of each scene in a manner that presents each of the views to a different eye of the viewer. A variety of different display technologies may be used, such as for example, anaglyph three dimensional system, passive-polarized three dimensional display system, active-shutter three dimensional display system, autostereoscopic lenticular glasses-free 3D display system, autostereoscopic parallax-barrier glasses-free 3D display system, and head mounted stereoscopic display system.

As three dimensional display systems become more readily prevalent the desire for suitable three dimensional content to present on such displays increases. One way to generate three dimensional content is using three dimensional computer generated graphics. While such content is suitable for being displayed, the amount of desirable such three dimensional computer generated content is limited and typically used for animated content. Another way to generate there dimensional content is using three dimensional video camera systems. Likewise, while such video camera content is suitable for being displayed, the amount of desirable such three dimensional content is likewise limited. A preferable technique to generate three dimensional content is using the vast amounts of available two dimensional content and converting the two dimensional content into three dimensional content. While such conversion of two dimensional content (2D) to three dimensional content (3D) conversation is desirable, the techniques are conventionally complicated and labor intensive.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

One technique to achieve two dimensional (2D) to three dimensional (3D) conversion is using a modified time difference technique. The modified time difference technique converts 2D images to 3D images by selecting images that would be a stereo-pair according to the detected motions of objects in the input sequential images. This technique may, if desired, be based upon motion vector information available in the video or otherwise determined.

Figure 1:
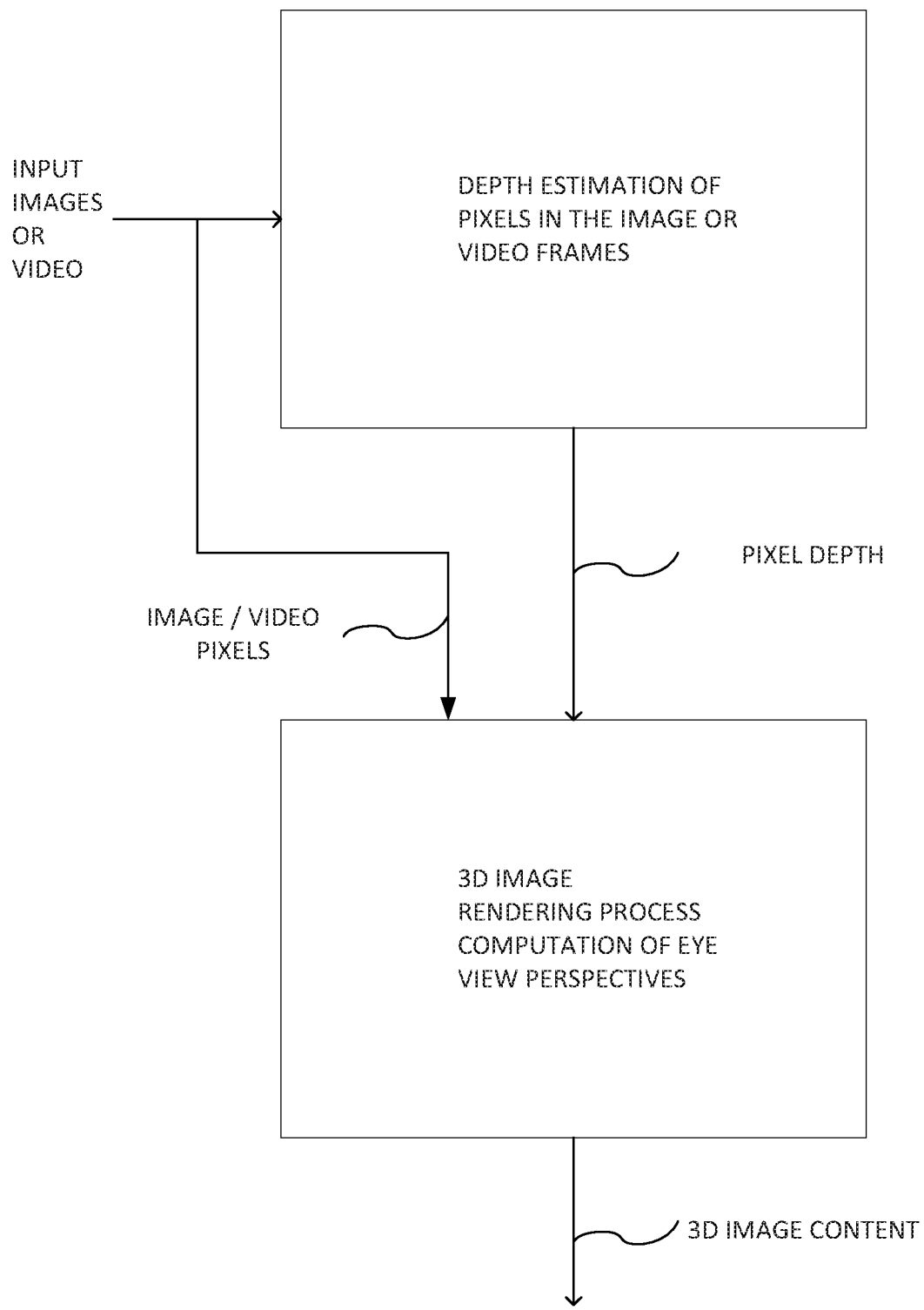
FIG. 1 illustrates an exemplary two dimension to three dimension image conversion process.

Another technique to achieve two dimensional (2D) to three dimensional (3D) conversion is using a computed image depth technique. The 3D images are generated based upon the characteristics of each 2D image. The characteristics of the image that may be used, include, but are not limited to for example, the contrast of different regions of the image, the sharpness of different regions of the image, the chrominance of different regions of the image, and texture of different regions of the image. Alternatively, the hue, the saturation, the brightness, and the texture may be used. The sharpness, contrast, and chrominance values of each area of the input image may be determined. The sharpness relates to the high frequency content of the luminance signal of the input image. The contrast relates to a medium frequency content of the luminance signal of the input image. The chrominance relates the hue and the tone content of the color signal of the input image. Adjacent areas that have close color may be grouped together according to their chrominance values. The image depth may be computed using these characteristics and/or other characteristics, as desired. For example, generally near positioned objects have higher sharpness and higher contrast than far positioned objects and the background image. Thus, the sharpness and contrast may be inversely proportional to the distance. These values may likewise be weighted based upon their spatial location within the image. Other techniques may likewise be used to achieve a 2D to 3D conversion of an input image, including motion compensation, if desired. Referring to FIG. 1, with a suitable depth map from the 2D to 3D conversion process, a 3D image generation process may be used to generate the 3D images based upon the image depth map.

Completely automatic 2D to 3D conversion processes typically result in sub-optimal three dimensional image for post-production content conversion. Post-production content conversion is typically very labor intensive with stereographers creating hand painted depth maps and selecting objects that move and rotoscoping to copy those edits to as many following frames as possible.

Figure 2:
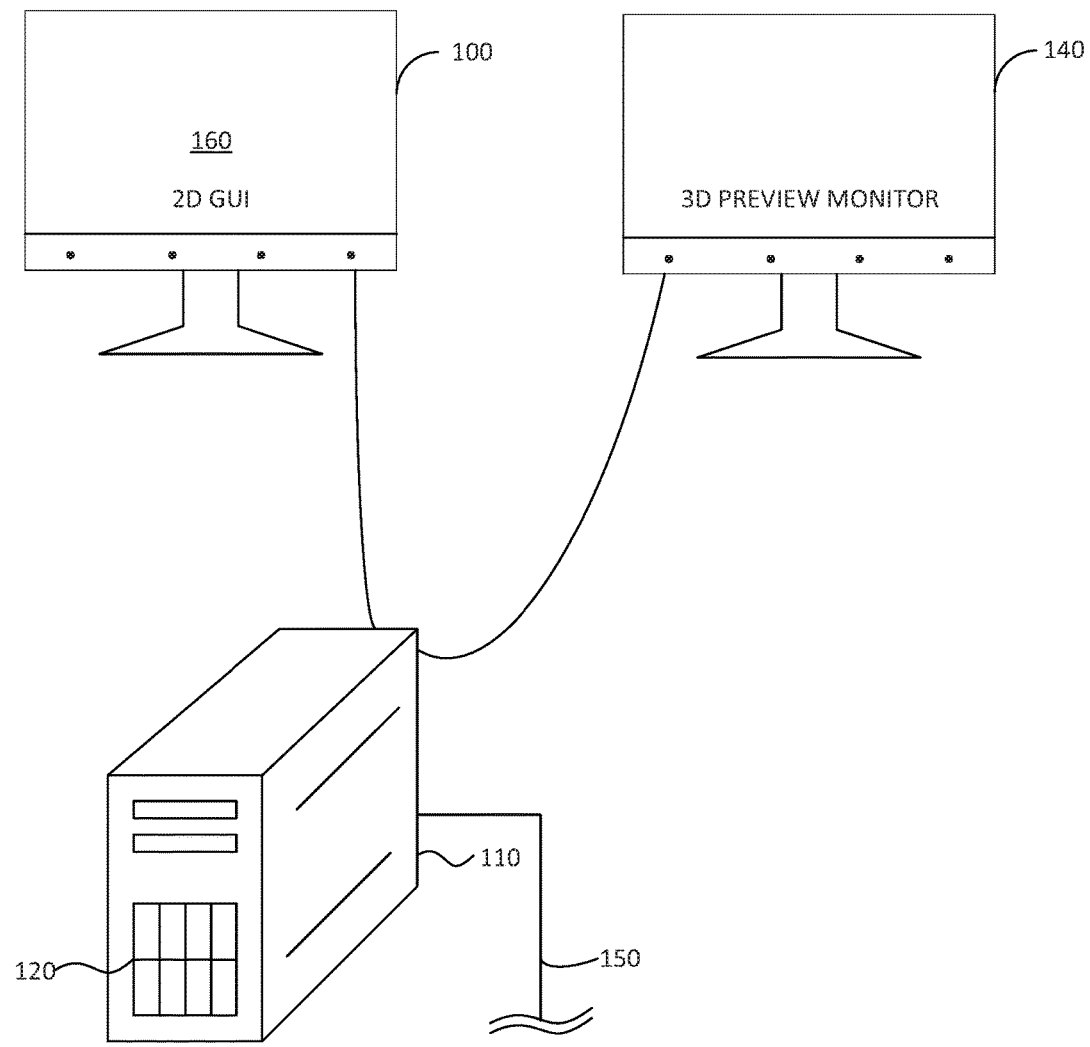
FIG. 2 illustrates an exemplary 2D to 3D image conversion system.

Referring to FIG. 2, the video content may be stored on a storage system 120, available from a network 150, or otherwise, and processed by the computing system 110. The user may use a display 100 as a user interface 160 for selecting three dimensional control parameters for the video content. The control parameters may be used to modify the 2D to 3D conversion process. The computing system may provide the 2D video content and/or control parameters for the 2D to 3D conversion accelerator, as described in detail later. The 2D-3D conversion accelerator then processes the 2D video content, based at least in part on the control parameters provided (if any), to generate 3D video content. Preferably the 2D video is provided together with the control parameters from the computing system 110 to the conversion accelerators. For example, (1) the video content may be provided as a single video stream where the left and right images are contained in a single video stream, and/or (2) the video content may be provided as two separate video streams with a full video stream for the left eye's content and a full video stream for the right eye's content. The 3D video content, as a result of the conversion accelerator, is rendered on the three dimensional display 140 so that the user may observe the effects of the control parameters in combination with the 2D to 3D conversion accelerator. The user may modify the control parameters, such as by modifying selections on the user interface, for the video content until suitable 3D images are rendered on the three dimensional display 140. The resulting three dimensional content from the 2D-3D conversion accelerator may be provided to the computing system 110, which may be stored in a three dimensional video format (e.g., 3D side-by-side, 3D frame-pack, frame-sequential 3D, for subsequent rendering on a three dimensional display. The 2D-3D conversion accelerator is preferably an external converter to the computing system 110.

While a user assisted conversion from 2D image content to 3D image content is feasible, it tends to be rather cumbersome to convert a substantial amount of such video content. Accordingly, it is desirable in a 3D entertainment device to include a fully automated 2D image content to 3D image content conversion system that provides a high quality output. Typically conversion systems are based upon combining visual analyzing and combining cues to create a depth map of the 2D image. The depth map contains a depth value for each pixel in the image or video frame. Rather than design increasingly more complicated 2D to 3D mathematical models of the 2D image content depth estimation, a different paradigm is being applied. In particular, the different paradigm should not be based upon attempting to determine a mathematical model and/or algorithmic based approach to analyze the 2D image content. A different paradigm preferably includes a neural network, which is an information processing paradigm that is inspired by the way biological nervous systems process information. In this way the neural network brain can be trained to create high quality image depth maps that are more extreme and approximate or mimic what a human could do. The training can result in conversions that are much more complex and sophisticated than a human team might be able to invent manually. The longer you train it the better it gets. Once trained, the neural-net brain with its weighted synapses of each modeled neuron and other learned parameters can be copied on to a hardware board or microchip and put into consumer or other market devices. These devices might just copy the neural-net, or they might also include on-board training processes such as genetic or back-propagation learning technology to continually improve themselves.

The result of the 2D to 3D conversion of images using the neural networks results in a depth estimation of each pixel in an image along with the 2D source image that are then processed using a 3D image render process. It is to be understood that any 3D display technology may be used, such as for example, stereo 3D display and multi-view auto stereoscopic display, or even holographic display. The system may process all of the input frames in order or a sub-set thereof. The rendered images may be suitable for glasses-based 3D or glasses-free 3D viewing technologies. The display may also be a projected display, if desired.

The result of the conventional 3D image rendering process tends to result in limited pop-out of the image content from the surface of the display particularly for glasses-free 3D displays due to limitations of the optics. This limits the compelling nature of the glasses-free display experience. Typically, if the 3D depth and pop-out is pushed to a more extreme level, artifacts (errors) in the 2D to 3D conversion process tend to become pronounced, so the 3D experience is limited in many displays.

Figure 3:
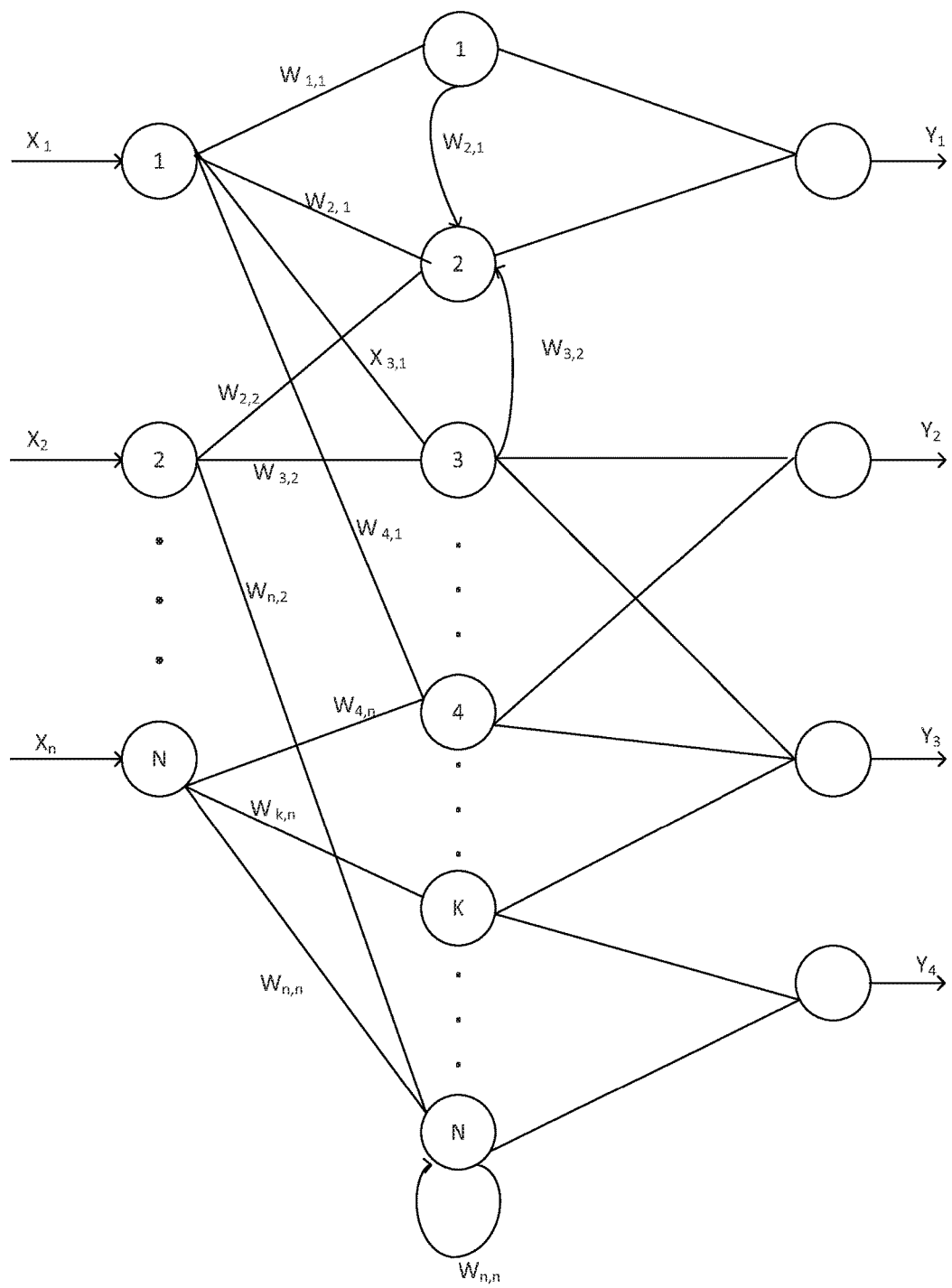
FIG. 3 illustrates an exemplary neural network.

Referring to FIG. 3, the neural network includes a number of interconnected computational elements working cooperatively to solve a problem. The neural network may be generally presented as a system of interconnected neurons which can compute values from inputs, and may be capable of learning using an adaptive technique, if desired. In general, the neural network may include the following characteristics. First, it may include sets of adaptive weights, e.g., numerical parameters that are tuned by a learning process. Second, the sets of adaptive weights may be capable of approximating a wide range of functions of their inputs. The adaptive weights, threshold activation functions may be conceptually considered the connection strengths/function computation on synapses between neurons. Traditionally, activation functions have been implemented with some sort of analog circuit due to their complexity. Preferably, a variety of synapse specific transfer function models may be implemented using a combined math-function and table-driven function. Preferably, synapse transfer function shapes can also be modified by neural training. Being able to modify the transfer function increases the sophistication of computation that can be performed at a synapse and thereby improves the intelligence of the neural net with less neurons. In general, the neural network, thresholds, and transfer functions perform many functions in collectively and in parallel by units. In addition, the neural network may optionally include back propagation, feed forward, recurrent, and genetic learning structures. The neural network technique can achieve a natural appearance for 3D structures similar to what a human might do manually because it can learn by comparing its results with human optimized examples.

Figure 4:
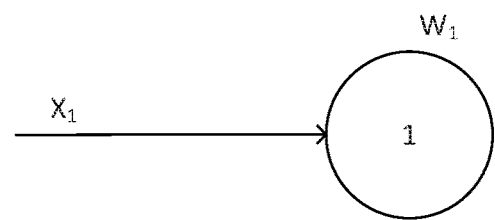
FIG. 4 illustrates inputs to the neural network.
Figure 4:
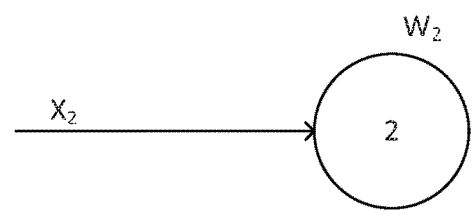
Figure 4:
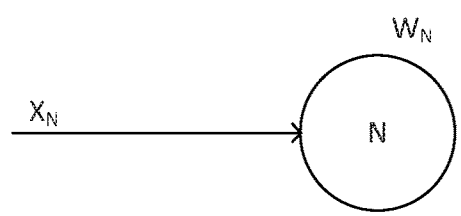

Referring to FIG. 4, the first layer is the inputs to the neural network which may be the output from various pre-analyzers including color space conversion, resolution decimation, texture, edges, facial and object detection, etc. The pixel values may be converted to a different format, if desired. Each of the neuron synapses may have a various associated weights, thresholds, and transfer functions associated therewith. Each activation function may be updated and may be unique for each node or synapse.

Figure 5:
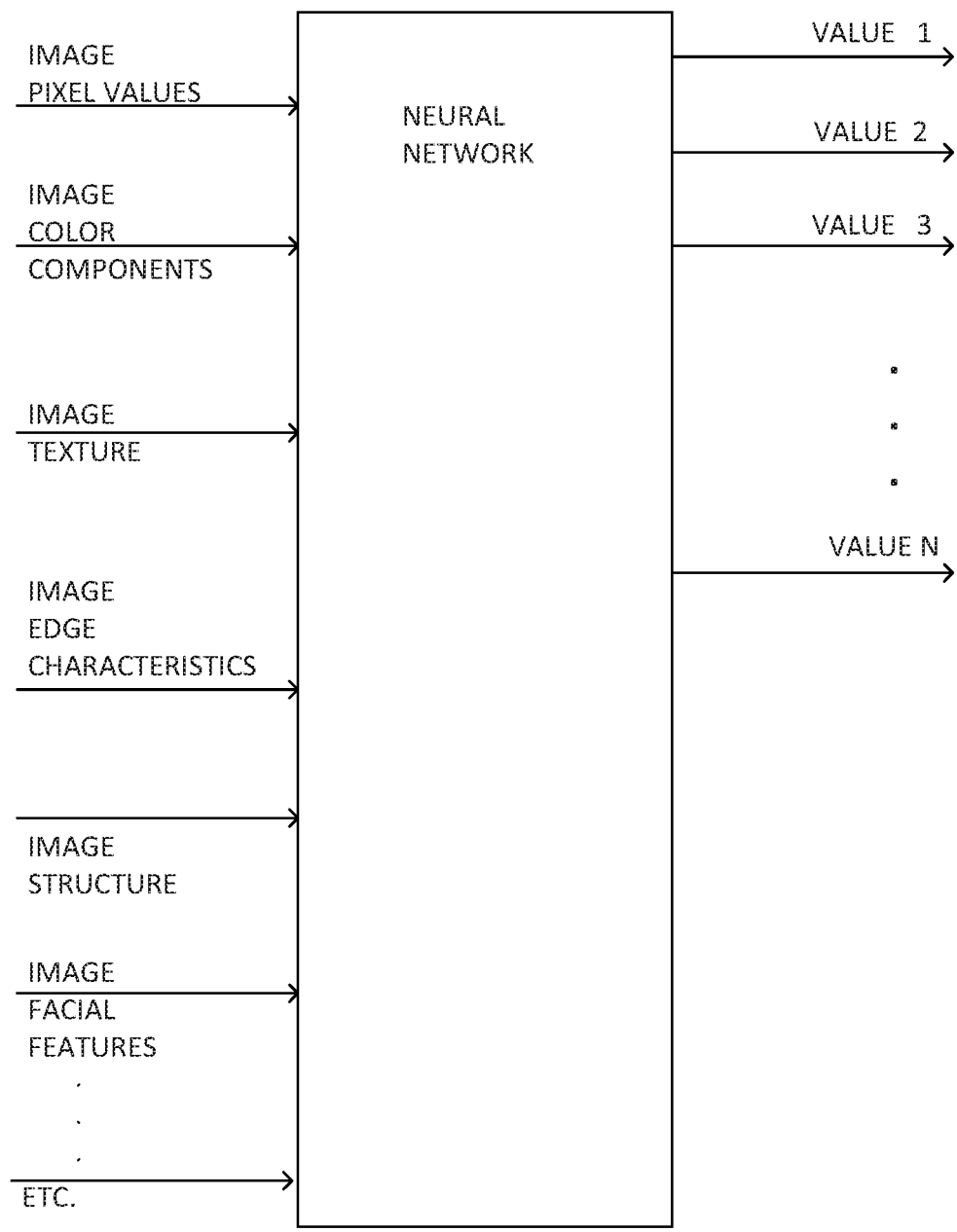
FIG. 5 illustrates a selection of image based inputs to the neural network and the outputs thereof.

Referring to FIG. 5, the preferable inputs to the neural network include information that may characterize the image. One of the inputs for an image, or regions of an image thereof, are the values of the pixels and the color components thereof. In many cases, the color components thereof are red, blue, green, and the associated magnitudes of the red, blue, green. Other techniques may be used to characterize an image, such as for example, red-blue-green-yellow, hue-saturation-brightness, or YCrCb.

While the hue, saturation, and/or brightness provide information regarding the color characteristics of the image, it is also desirable to include information related to the nature of the texture of the image. In general, texture characteristics quantify the perceived texture of an image. As such, texture characteristics provide information about the spatial arrangement of color and/or intensities in an image or a selected region of the image. Texture provides indications that an object in an image or frame might be closer. A texture may have its own 3D depth texture.

While the hue, saturation, and/or intensity, together with texture characteristics, provides information regarding the characteristics of the image, it is desirable to also have information regarding the edge characteristics of the image. In one manner, edges may be determined at point or lines or arches of an image at which the image brightness changes sufficiently sharply. The edge aspects of the image tend to indicate discontinuities in the depth of the image, discontinuities in the surface orientation, changes in material properties, and/or variations in scene illumination.

It may be desirable to include information related to the structure of items within the image. Such structure information may be obtained in a suitable manner, such as through segmentation based techniques. In general, the structural information may be generally related to the identification of items within the image. This structural information may be provided as an input to the neural network to further determine a more accurate depth map.

It may be desirable to identify facial images within the image. In addition, it may be desirable to further identify facial features within the facial images. The facial features of the image tend to be those regions of the image that are of particular importance to the viewer. In addition, it is desirable to limit the three dimensional aspects of the facial region of the image so that it doesn't inadvertently become distorted. In addition, it is desirable to modify the depth map so that the facial features will tend to be rendered in a visually pleasing manner. Accordingly, the rendering for the facial features may be different than that for other aspects of the image.

It may be desirable to modify the estimation of the depths and/or the rendering based upon the type of rendering device. The estimation of the depth and/or the rendering may also be based upon updating of the fields and/or system feedback.

One technique for training a neural network is to collect a selection of images and associated instrument measured three dimensional depth maps. The output of the processing by the neural network may be graded for accuracy, and the neural network updated accordingly to cause learning.

Figure 6:
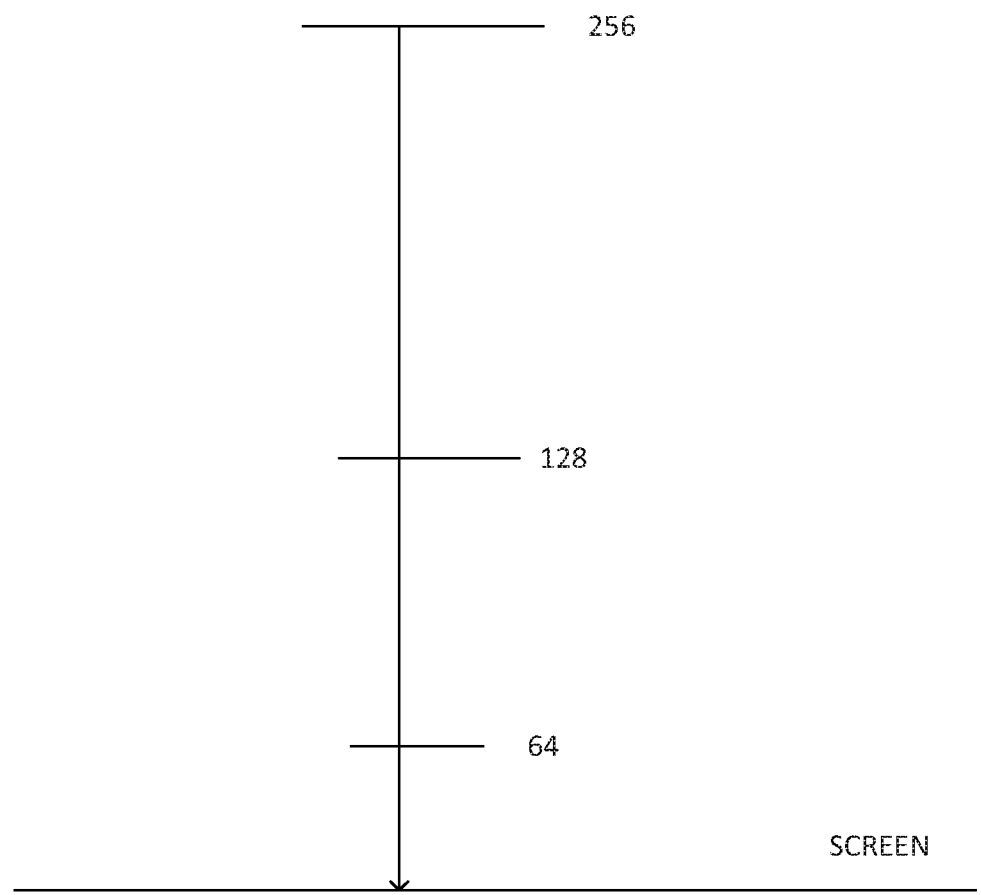
FIG. 6 illustrates a selection of bit depths associated with a three dimensional image.

Referring to FIG. 6, with an improved depth map, with a reduced amount of errors or other irregularities, it is desirable to increase the 3D depth and popout for the three dimensional image or frame on the display. For example, for an eight bit depth range for the depth map and/or the 3D image generation process, the depth behind the image plane may be broken up into a depth having 256 depths (e.g., 8 bits). By way of example, the 8-bit depth map may be referenced from a 255 level being at the plane of the screen. In this manner, all of the three dimensional content would appear to be behind the screen. Pretty much all 3D depth may be represented by a range of 0 to 255 or eight bits of resolution. The amount of perceived depth is determined by the amount of horizontal displacement of left and right eye pixels associated with a depth value. One can think of 3D as a three dimensional box where the top, bottom, left and right sides are at the edges of the display. The far back of the box is at depth 256 and the near point is at the display screen and has depth value of zero. In this example all 3D is rendered behind the display screen. If you consider three dimensional coordinates where x axis is across the width of the screen, and y axis measures up and down on the screen, then the z axis measures distance behind the screen or in front of the screen. There may be an additional control of a z axis offset control where the three dimensional box can be offset on the z axis to be partly or even entirely in front of the screen instead of only behind the screen. By offsetting the three dimensional box partly out of the screen creates the 3D popout effect that so many viewers associate with the pleasure of watching 3D. The content moves into the viewer's geometric space. By using this z offset, content that is originally in 2D can be converted and spread across the space in front of the screen and behind the screen. While content is currently converted by humans in a very manual intensive process to create this effect in movies, this adjustment technique may do this in a real-time 2D to 3D converter. The movie "Titanic" was converted to 3D by a team of 300 people and took 18 months. The technique described herein may convert 2D "Titanic" to 3D real-time in less than one frame delay (one sixtieth of a second) and have part of the movie significantly popped out into the viewer's space during the entire movie in a natural easy-to-watch way that creates an enjoyable 3D experience. The technique can do that and output to any type of 3D display that is glasses-based 3D, or glasses-free 3D, or even holographic 3D.

Figure 7:
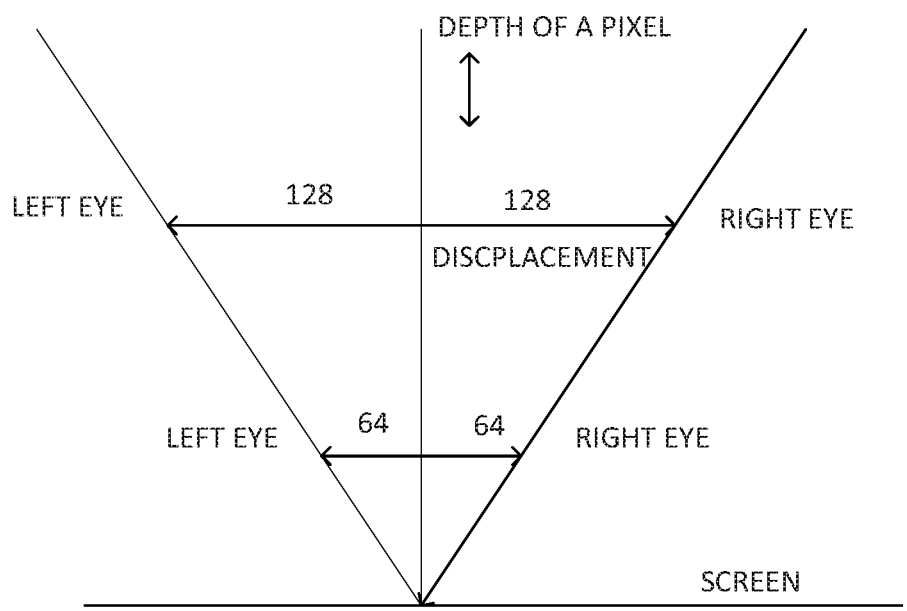
FIG. 7 illustrates selection of pixels of an image shifted different distances to provide right eye versus left eye displacements derived from estimated depth to create the perception of apparent three dimensional image depths.
Figure 7:

Referring to FIG. 7, for example a pixel in the picture plane with a depth map pixel corresponding to depth-level 128 may be viewed at such a depth by shifting the pixel for the right eye view to the right by an appropriate distance and shifting the left eye view to the left by an appropriate distance from what would have otherwise been a central location in a two dimensional image. The same pixel in the picture plane with a depth map corresponding to 64 may be viewed at such a depth by shifting the pixel in the right eye view to the right by an appropriate distance and shifting the left eye view to the right by an appropriate distance from what would have otherwise been a central location in a two dimensional image. As illustrated in FIG. 7, the central location would be the same for both shifts, namely, a bit depth of 128 and a bit depth of 64. As it may be observed, the greater that the pixel position is horizontally separated in space, one for the left image and one for the right image, the greater the apparent depth of the pixel in the image.

Figure 8:
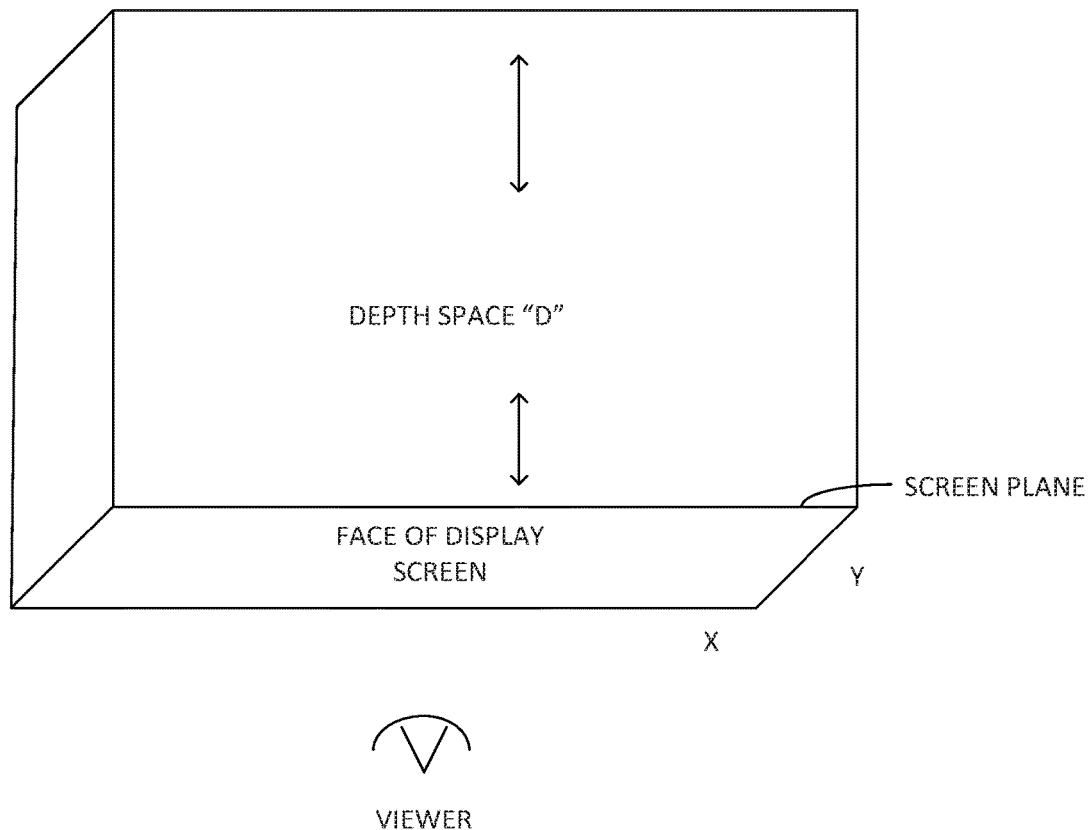
FIG. 8 illustrates a screen place and a depth space "D".

Referring to FIG. 8, the image may be mapped into a depth space based upon a relative location of the front of the screen, which may be considered a "0" point for convenience having a depth of "D", such as 256 levels for an 8-bit depth. It may be desirable to provide the appearance of a substantial portion of the 3D image appearing in front of the plane of the screen for increased visual desirability.

Figure 9:
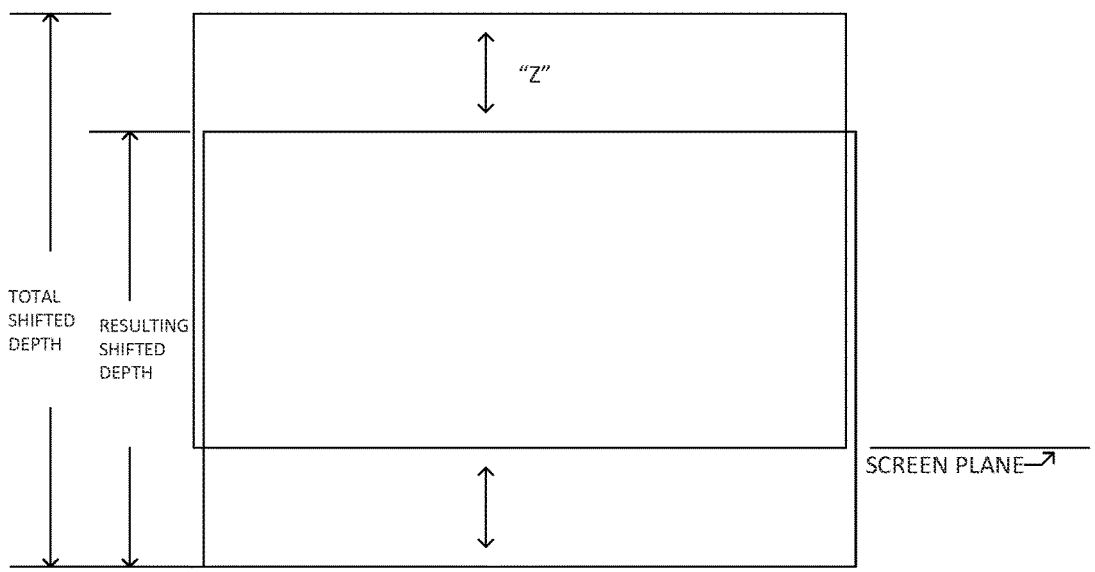
FIG. 9 illustrates a screen plane, a shift "Z", a total shifted depth, and a resulting shifted depth.

Referring to FIG. 9, the depth map of the image may be shifted by an amount "Z" relative to the screen plane. In this manner, the maximum depth of the image behind the screen plane is reduced by the amount Z. In this manner, the depth of the image in front of the screen plane is increased by the amount Z. As it may be observed, the overall depth of the pixel remains the same. In other embodiments, the image may be scaled to shift the image to increase the overall depth of the image in front of the screen plane, such as using a linear or non-linear function Z. Also, the image may be both scaled and shifted, if desired. However, preferably the resulting shifted depth of a pixel is less than the total shifted depth of the image. The shifting of the pixel may be achieved by adding and/or subtracting a depth value of Z and then remapping the pixels to the modified three dimensional depth.

Figure 10:
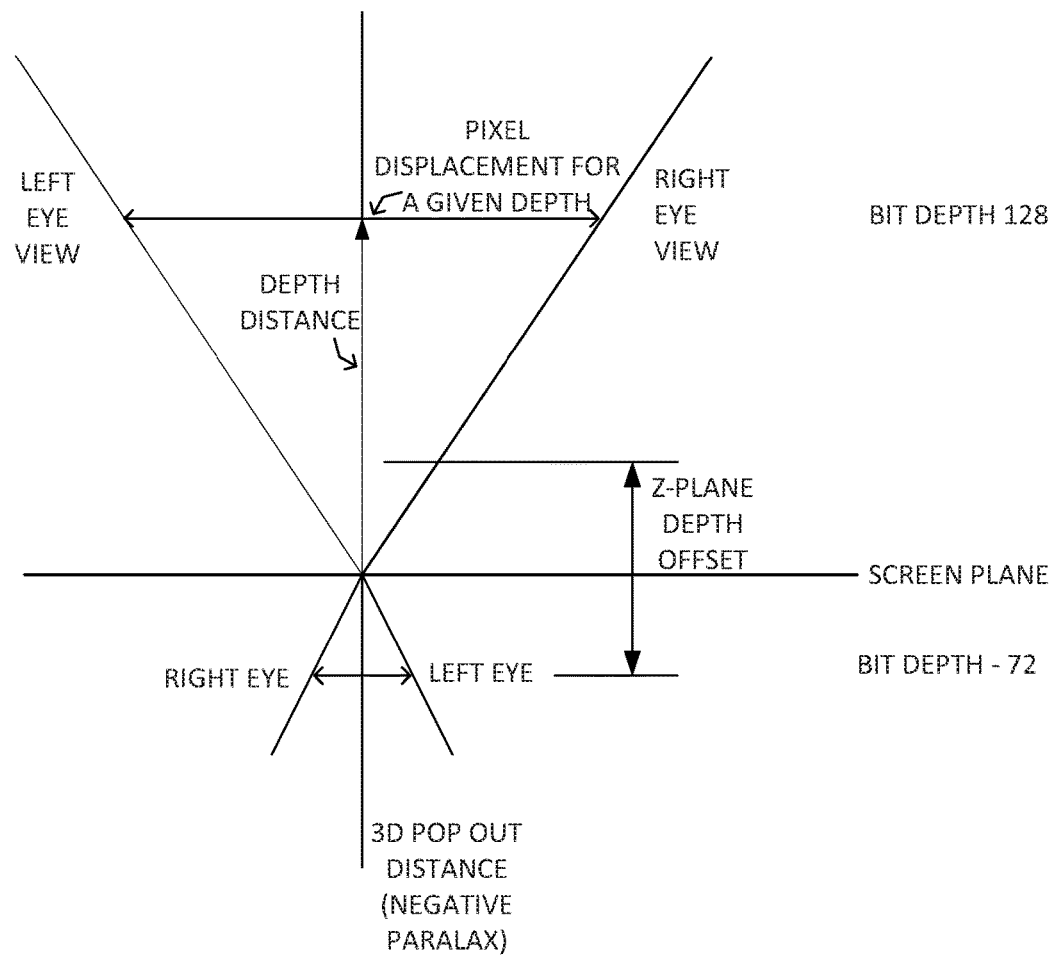
FIG. 10 illustrates a corresponding left eye displacement view and a right eye displacement view at a first depth plane shifted to a second bit depth in front of the screen plane.

Referring to FIG. 10, by way of example, an original bit depth of 128 may include a pair of shifted pixels to provide such a bit depth appearance. If the offset of Z is −200, then the resulting bit depth of the pair of shifted pixels will be −72 (i.e., 128−200=−72). Negative z axis values are in front of the display screen, it is observed, in the process of shifting a pixel across the screen plane, the direction of the pixel shifts for the eyes swaps when the pixel z position has a negative value. The pixel for the right eye is shifted to the left, and the pixel for the left eye is shifted to the right eye. This process may be repeated for all the pixels of the image based upon their respective depth value and the three dimensional box z offset.

Figure 11:
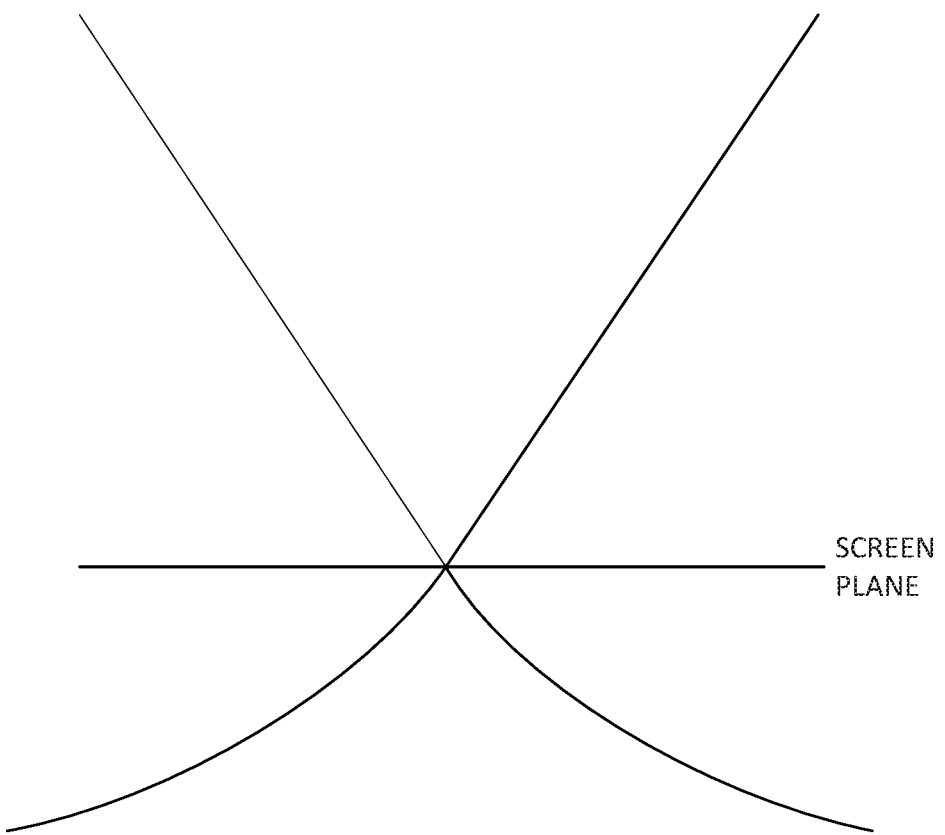
FIG. 11 illustrates a left eye displacement and a right eye displacement at a first depth plane shifted to a second bit depth in front of the screen plane using a non-linear mapping.

In many cases, the spatial separation between objects is not well defined. This lack of spatial separation between objects tends to result in difficulty in the discrimination of objects in three dimensional space. After further consideration, it was determined that the non-linear nature of the human visual system results, at least in part, in such difficulty. In particular, as objects get closer to the viewer the ability of the human visual system to discriminate between different objects is reduced. To reduce the lack of spatial separation between object in the image, especially as a result of modification of the mapping of the objects to spread the across depth, it is desirable to include a non-linear re-mapping process. Referring to FIG. 11, a modified mapping may be based upon a generally concave curve-like function whereas the pixel mapping increasingly moves further in front of the display the curve tends to displace the pixels a greater distance. This revised mapping may be used for the entire display or a portion thereof.

Figure 12:
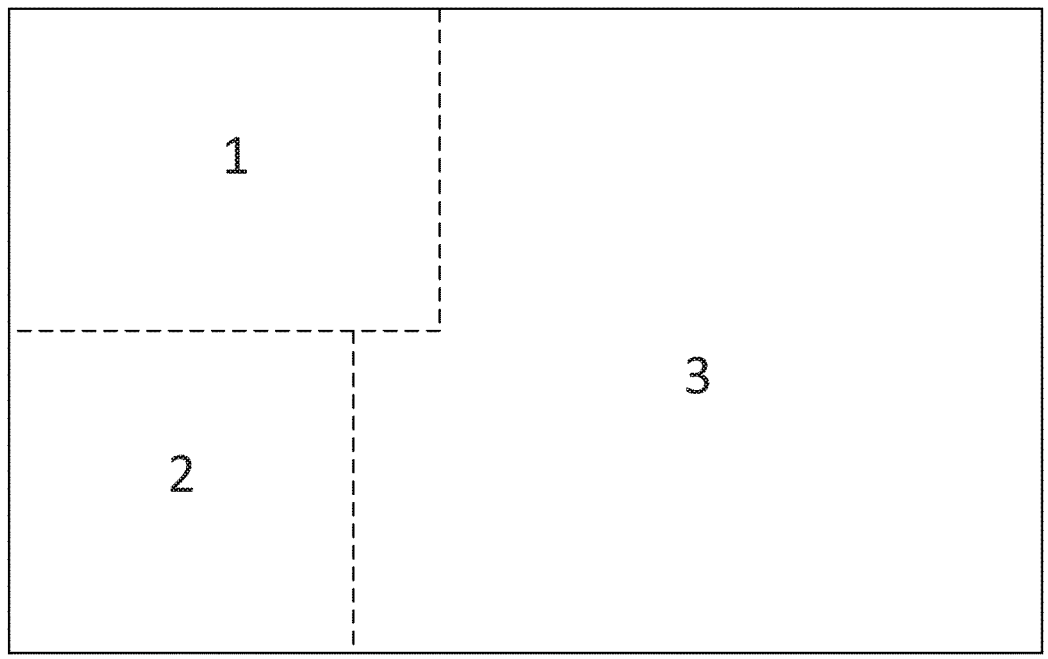
FIG. 12 illustrates a left eye and a right eye at a first depth plane shifted to a second pixel depth in front of the screen plane using a plurality of non-linear mappings.
Figure 12:
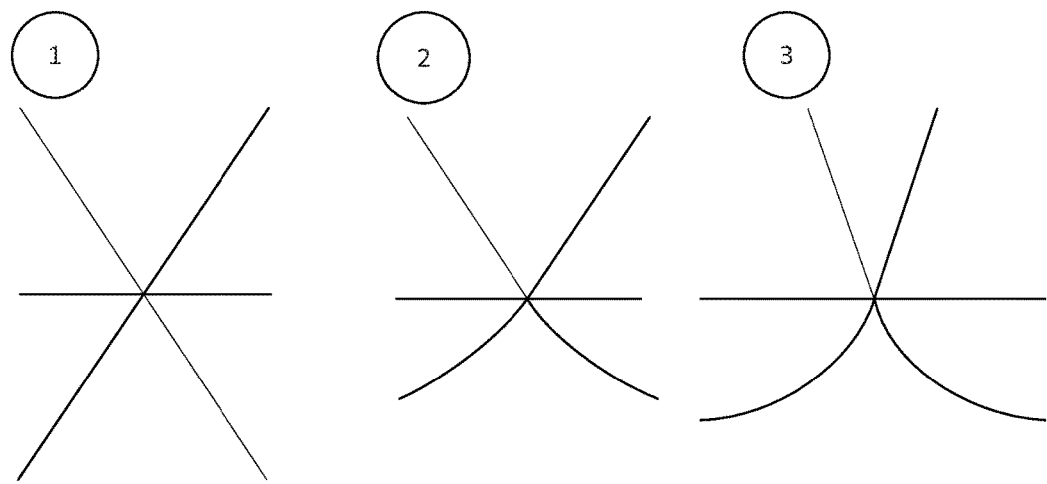

Referring to FIG. 12, the image may be separated into a plurality of different regions, such as region 1, region 2, and region 3. The regions are preferably defined based upon the objects detected in the image, such as for example, using a segmentation based technique, a face based technique, a texture based technique, etc . . . One of the regions, for example, may be a facial region of a person. For each of the regions, a different mapping may be used that is selected to enhanced the visual quality for the viewer.

Figure 13:
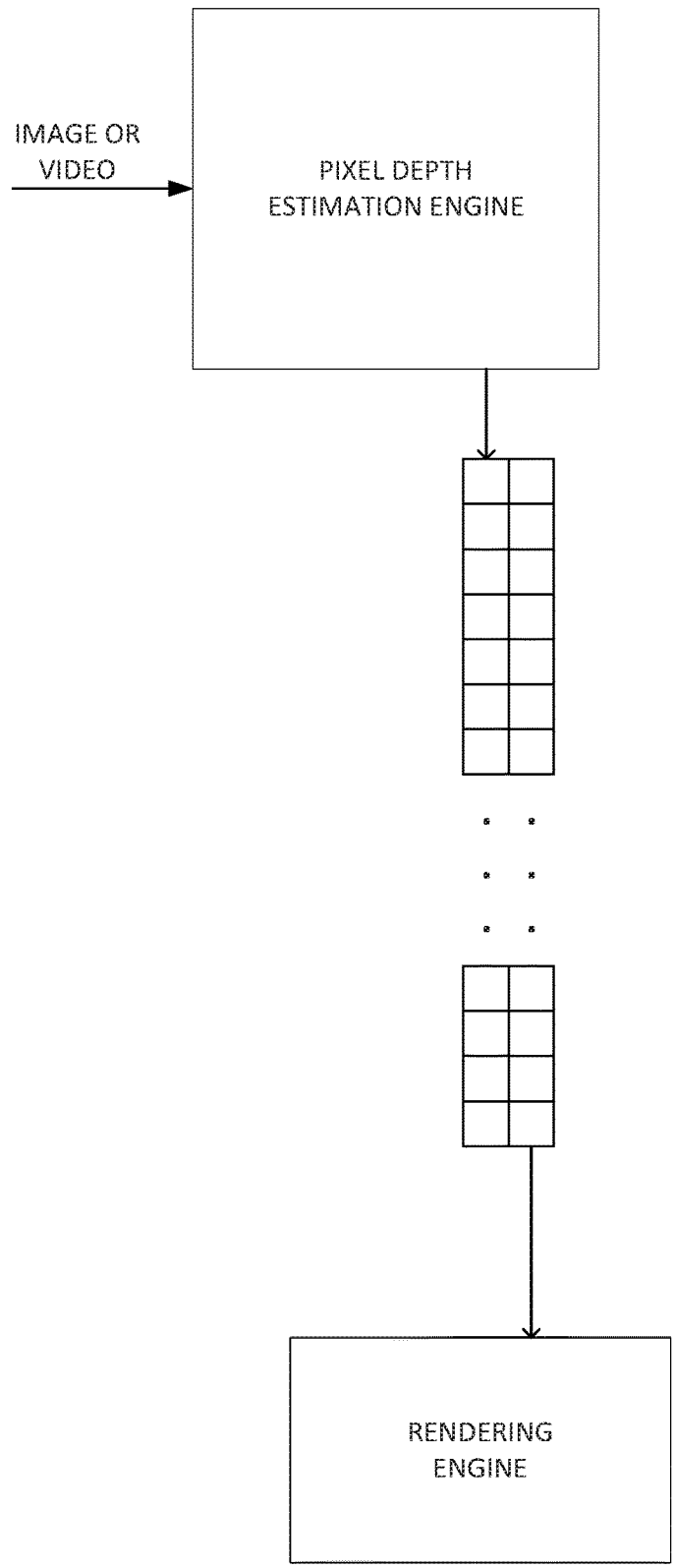
FIG. 13 illustrates a depth engine, a depth reprofiling modification mapping, and a rendering engine.

Referring to FIG. 13, the 2D to 3D conversion of images (e.g., depth engine) may result in a pixel depth estimation. The data structure may provide a mapping between the input depth map and the output depth map, which accounts for the non-linear optimization of the depth of the image. The optimized depth map is then provided to the 3D image render process (e.g., rendering engine). More than one data structure may be used, if desired, each with different properties. This provides an efficient technique for the mapping for the depth map adjustment. By way of example, the depth map re-profiling may be performed in accordance with a look-up-table. Each table entry may re-map an input depth value to a modified output value. By way of example, the depth map re-profiling may be performed in accordance with a formula. Each input depth value may be modified to a modified output value based upon the formula. By way of example, the depth map re-profiling may be performed in accordance with a non-linear curve (e.g., a mapping between an input depth N and an output depth Y). Each input depth value may be modified to a modified output value based upon the curve. By way of example, the depth map re-profiling may be performed in accordance with a linear level (e.g., a linear mapping between an input depth N and an output depth Y). Each input depth value may be modified to a modified output value based upon the level. By way of example, the depth map re-profiling may be performed in accordance with a histogram based technique (e.g., a histogram of values where the lower point may be dragged to stretch the depth towards or away from the back, where the higher point may be dragged to stretch the depth towards or away from the front, and a central point to stretch or compress the depth forward or backward). Each input depth value may be modified to a modified output value based upon the histogram.

Display devices tend to include a substantial number of pixels, such as a 4K display having 4096×2160 for an iMax movie, or 3840×2160 for new 4K UHD TV standard. An 8-bit per color channel 4K UHD video frame requires a buffer memory having a size of approximately 32 MB to store an uncompressed frame of data. Using such a large buffer for one or more frames for the neural network tends to be costly and consume significant amounts of power in memory accesses which is problematic for a mobile device which has limited battery life.

Figure 14:
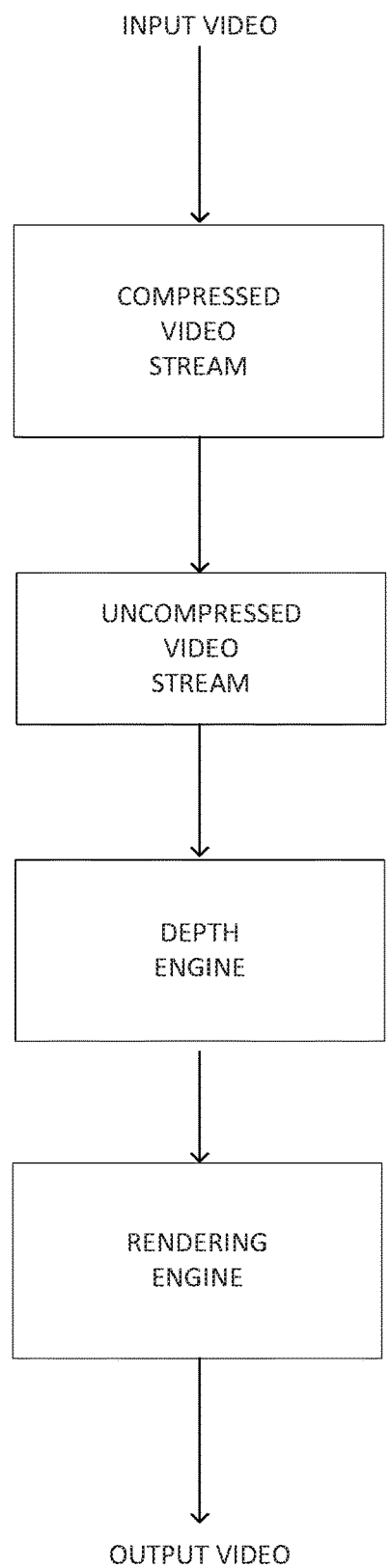
FIG. 14 illustrates a video stream processing technique.

Referring to FIG. 14, to reduce the power consumption requirements it is preferable to receive a compressed video bitstream serially, the way it is broadcast, in a line-by-line manner, then uncompress it serially in a line-by-line manner. The uncompressed video bitstream is then provided to the depth engine in a line-by-line manner (or portions thereof).

In this manner, the depth engine outputs a depth map in a line-by-line manner (or portions thereof). The depth engine may include a limited amount of temporal buffering so that small regions of the image may be processed to determine image characteristics, such as texture, edges, facial regions, etc. In this manner, a few lines of pixels of a particular image (i.e., less than all) are being provided to the depth engine while the depth engine is simultaneously providing its outputs, which are likewise being provided to the rendering engine while pixels of the particular image are still being provided to the depth engine. This technique substantially reduces the buffering requirements, and therefore the power consumption of devices, such as mobile devices. This is not readily achieved by processor-based/software-based systems do to the limited performance of processes, but it is more readily achievable with a neuro network architecture.

One technique to modify the bit depth of the depth map may be as follows. The system may use a small direct memory access memory such as a 256 deep memory where the original depth value is used as an index (address) into the memory which outputs a new depth value.

Figure 15:
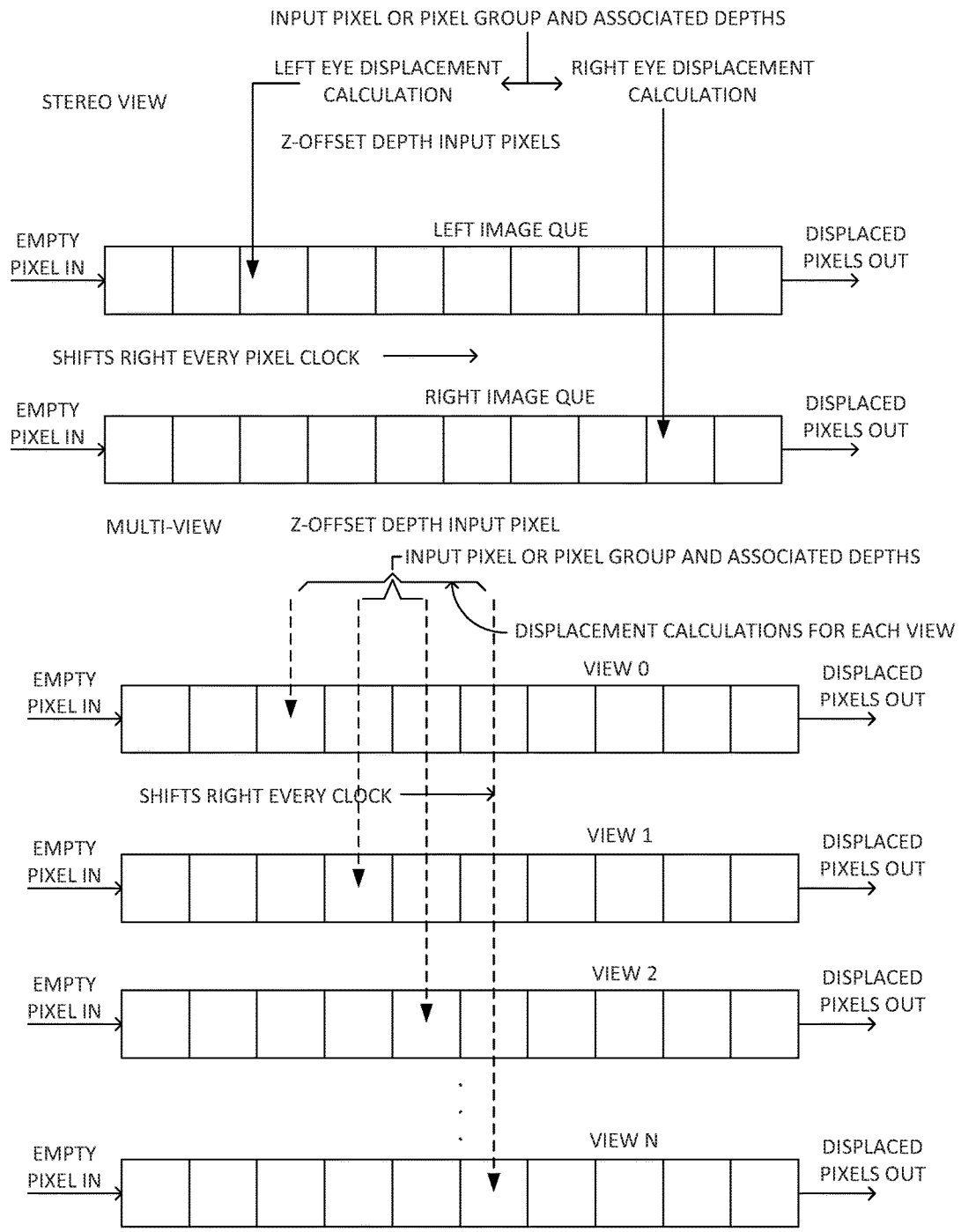
FIG. 15 illustrates a left-eye image queue and a right-eye image queue.

Referring to FIG. 15, the depth engine or the modified depth map, may be provided to a FIFO queue of streaming pixels for the left image view and a FIFO of pixels for the right image view that is provided to the rendering engine. In some embodiments, the queues may be a combined queue, if desired. The queue is preferably sized to be representative of at least the largest potential displacement plus and minus permitted of a corresponding pair of pixels. The source pixel is displaced from the middle of the fifo based upon the displacement associated with the the pixel's depth map value and z offset control and the specific view. Additional "video effects" displacement offsets can be added to the normal displacement offset to create a variety of special effects or video compensations for the image on specific display technologies.

With the displacement of the pixels being known for a particular location of the image, the right pixel may be displaced in the right image queue buffer at an approximate position relative to the left pixel queue buffer. For each pixel of the image being provided for a line or portion thereof for the image, the pixel values may be positioned in an appropriate location within the respective left image queue and the right image queue. Because the pixels are handled real-time as they flow through the architecture, there is no need for the typical external DRAM to buffer many tens or hundreds of frames that would be needed if this was implemented in software. This dramatically reduces power, and die size because the structure is orders of magnitude more efficient than a processor or array of processors.

Figure 16:
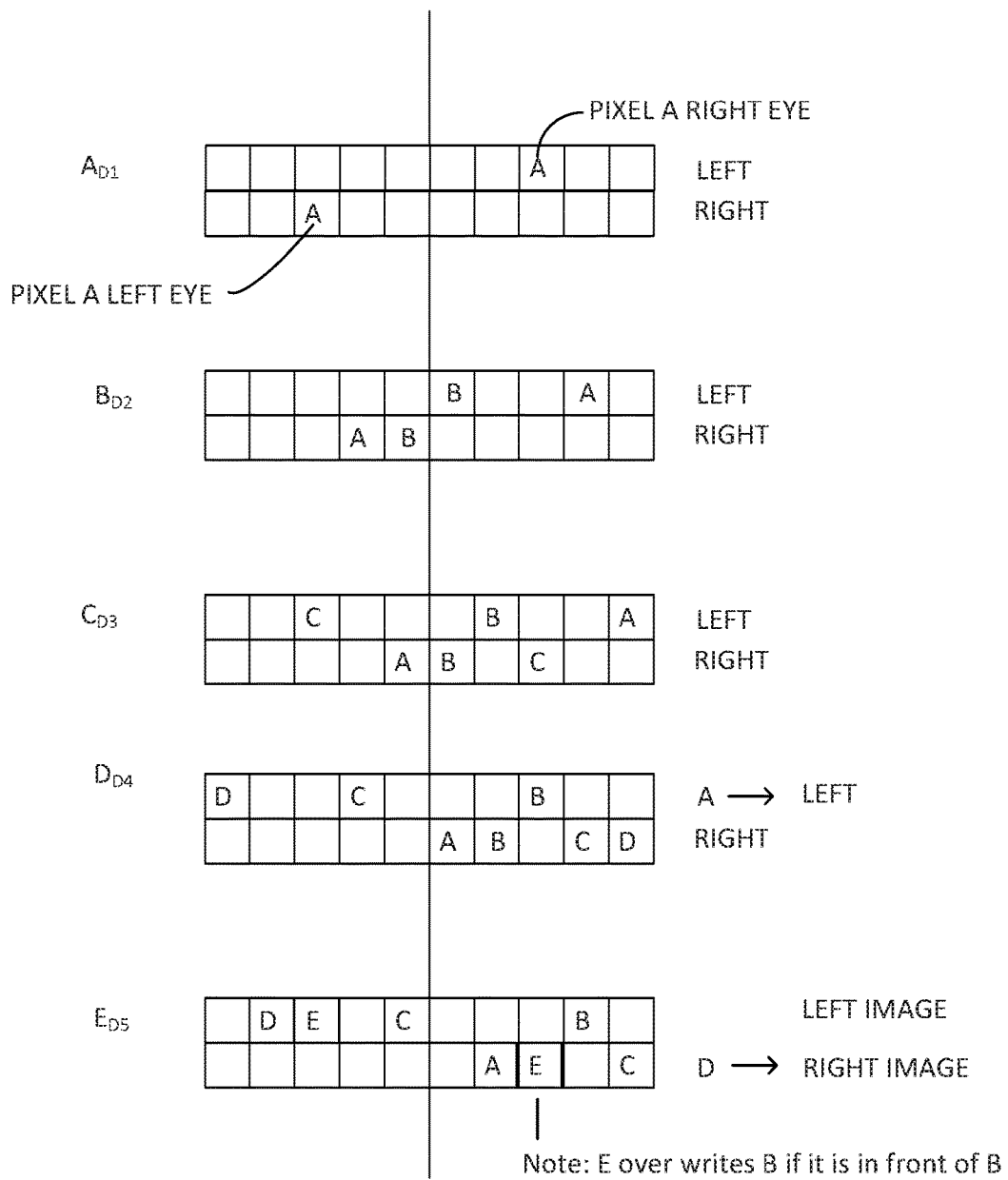
FIG. 16 illustrates a left image queue and a right image queue receiving a sequence of displaced pixel values.

Referring to FIG. 16, an embodiment illustrates one technique to use a displacement technique with a pair of buffers. This particular example is a stereo or two-eye view, but may also be modified for a glasses-free 3D model when more views are desired. In that case, there would often be a row for each view. The depth map or modified depth map may have a pixel value A with a displacement D1. The pixel value A is then included in the left image queue to a pixel position that is left of the original and pixel value A is inserted in the the right image queue to a pixel position that is right of the original by an amount corresponding to D1. This is a stereo 3D example or 2-view autostereo example. For multi-view there would be a unique displacement in each FIFO that represents a multi-view view. In the Stereo 3D or two-view example, the pixel value B is then included in the left image queue and the right image queue offset from the mid-point with a displacement D2. The pixel values of A and B are shifted to the right, the depth map or modified depth map may have a next pixel value of C with a displacement D3. The pixel value C is then included in the left image queue and the right image queue offset from the mid-point with a displacement D3. The pixel values of A, B, and C are shifted to the right, the depth map or modified depth map may have a next pixel value of D with a displacement D4. The pixel value D is then included in the left image queue and the right image queue offset from the mid-point with a displacement D4. The pixel values of A, B, C, and D are shifted to the right, the depth map or modified depth map may have a next pixel value of E with a displacement D5. The pixel value E is then included in the left image queue and the right image queue offset from the mid-point with a displacement D5. The pixel value of A is provided for the left image and the pixel value of D is provided to the right image. This process may be continued, as desired. As it may be observed, the size of the buffer may be substantially reduced thus saving power consumption for the device. As it may be observed, the placement of the pixel values in the queues are performed with only write commands which is more energy efficient, and the only a pair of pixel values are ready out of the queue for rendering on the display.

Figure 17:
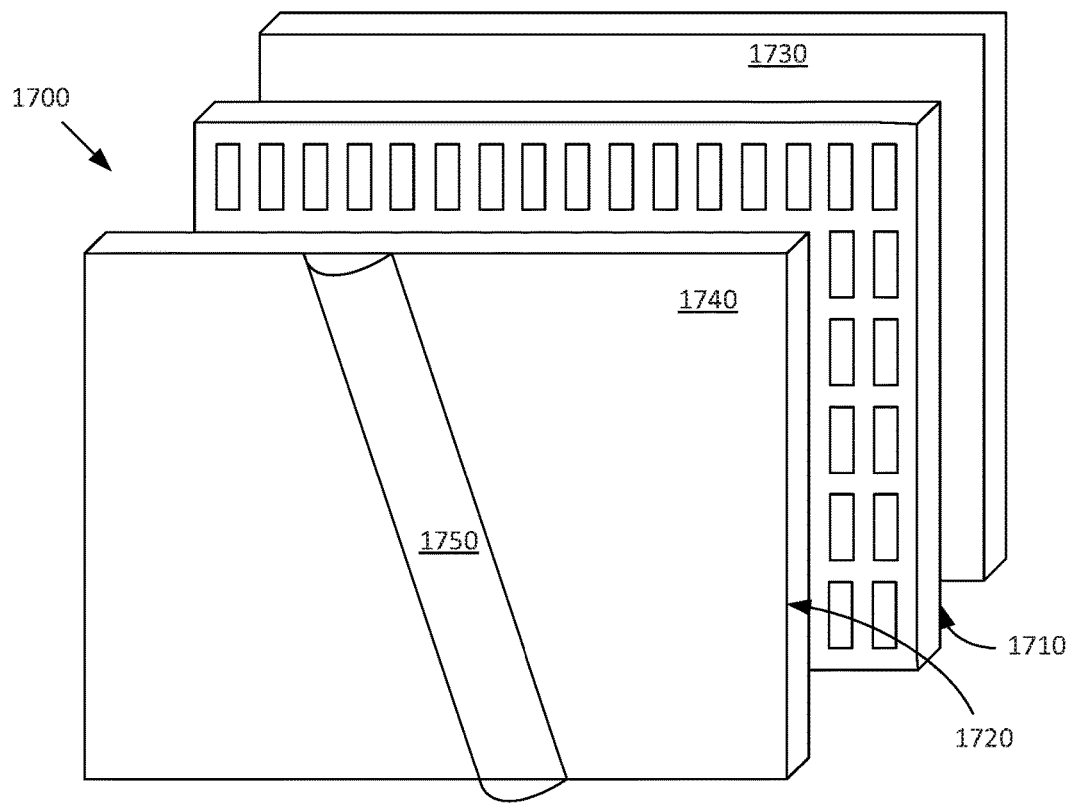
FIG. 17 illustrates a display with pixels and/or sub-pixels and an optical lens element for supporting lenticular glasses-free 3D autostereoscopic multi-view.

To help understand and example of how glasses-free 3D displays work, referring to FIG. 17, in a typical lenticular autostereoscopic display apparatus 1700 includes a matrix pixel display device comprising a LC (liquid crystal) display panel 1710 having a row and an angular lens column array of display elements 1720 and acting as a spatial light refraction to visually isolate specific views relative to each of a viewer's eyes a backlight 1730 is also illustrated. Lenticular elements are provided such as by using a lenticular sheet optical lens with prisms 1740 whose lenticules 1750 (exaggerated in size), include elongate semi-cylindrical lens elements, extend in the column direction of the display panel, parallel to the display element columns. Each lenticule overlying a respective group of two, or more, adjacent columns of display elements. In many LCD display panels the LCD matrix includes regularly spaced rows and columns of display elements. Typically, the display arrangements are arranged as columns of approximately square pixels, where each pixel is composed of a row of red, green, and blue sub-pixels. A group of three of or more sub-pixels (e.g., red, green, and blue) form a pixel of the display. Other structures and arrangements of display elements and optical elements may be used.

In an arrangement where each lenticule is typically associated with two to four columns of display sub-pixels per pixel row, the display sub-pixels in each column provide a vertical segment of a specific eye-view to be rendered. A single prism on the lenticular lens typically has a magnification of 2× to 4× which allows primarily one of the subpixels to be seen from a specific eye-view angle on a specific pixel row. Being that a viewer second eye is at a different horizontal viewing position, it would see a different view and subpixel compared the the first eye. This is what enables the ability to deliver a different view experience to each eye. In multi-view screens which have 7, 8 or 9 views, a viewer can move their head side to side and see various views in each eye that appear like you can see around 3D objects.

Figure 18:
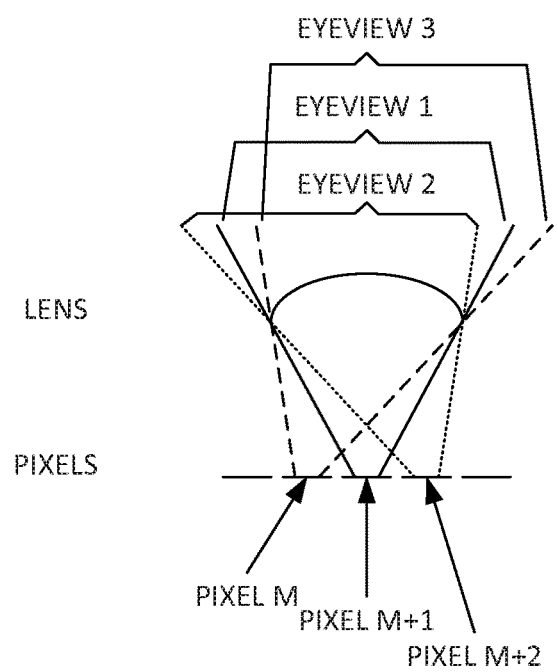
FIG. 18 illustrates a lenticular type imaging arrangement.

Referring to FIG. 18, the operation of a lenticular type of an imaging arrangement is illustrated. The light source, display panel, and lenticular sheet are illustrated. The arrangement provides three views of each image projected in a different direction. Eye position 1 could be the viewer's right eye, Eye position 2 could be a viewer's left eye. Each sub-pixel on a pixel row of the display is driven with information for one specific view, such as for the left or right eye of the viewer. Given that each eye of a view sees a different view, a person will perceive a stereoscopic image. It may be observed that the particular view being observed depends on the location of the viewer, which is represented at a particular observing location.

Figure 19:
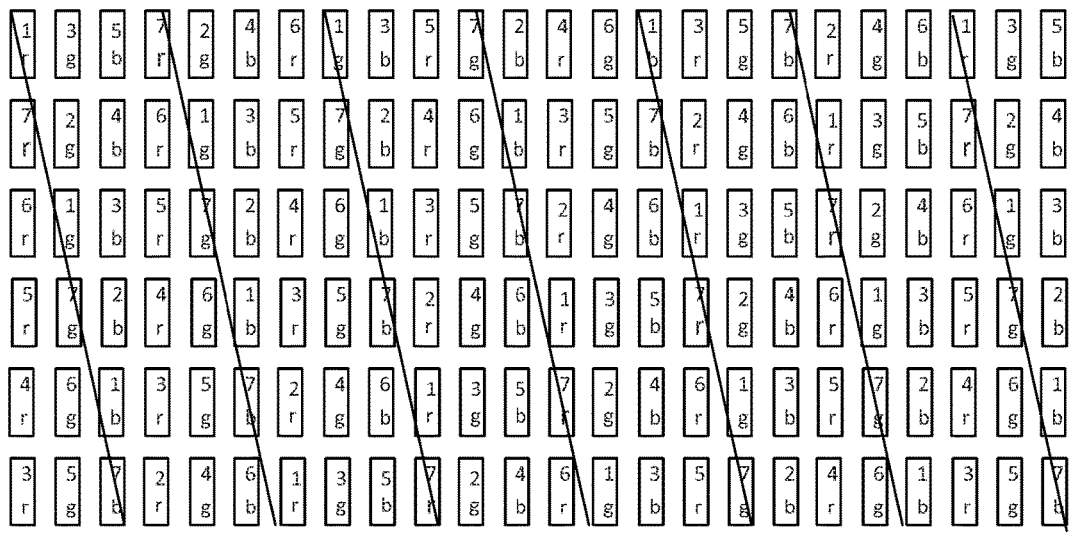
FIG. 19 illustrates a lenticular type sub-pixels under the slanted lenticular lens imaging arrangement.

Referring to FIG. 19, the lenticules may be arranged in a slanted arrangement with respect to the columns of display pixels, that is, their main longitudinal axis is at an angle to the column directions of the display element array. In this arrangement, the sub-pixels are labeled with their corresponding view of the multi-view arrangement. As it may be observed, some of the pixels are split among a plurality of different lenticules so that part of its light is projected by more than one lenticular. In addition, the particular view being observed depends on the location of the viewer, which may be represented as a particular point location.

Figure 20:
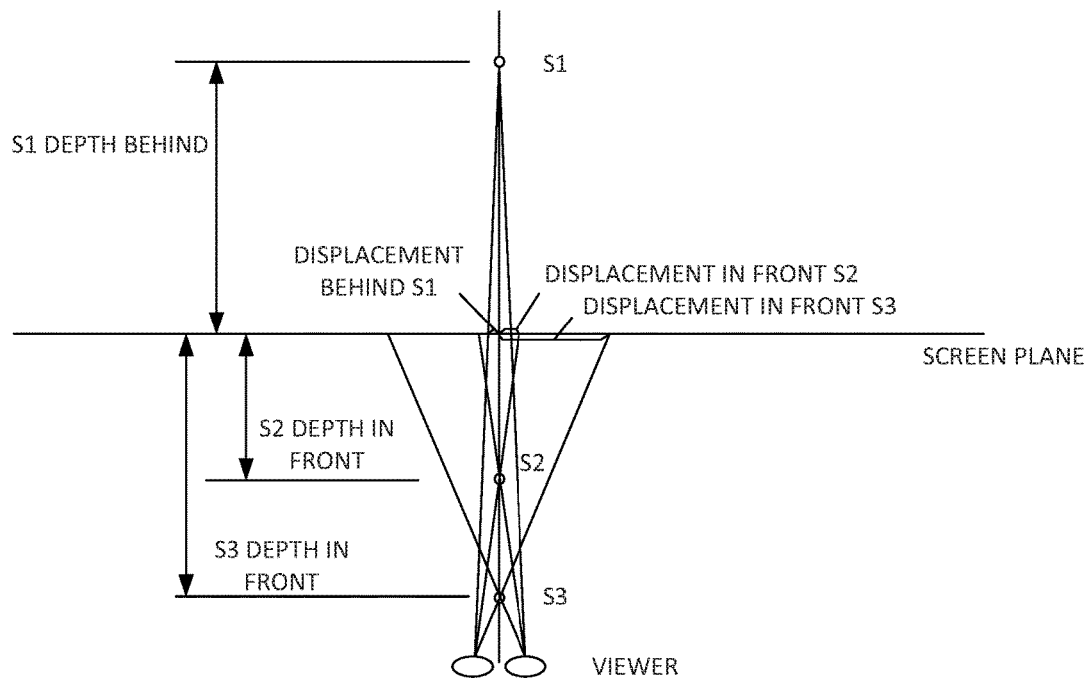
FIG. 20 illustrates an alternate model for computing pixel displacement with examples of a pixel depth behind the screen and a pixel depth in front of the screen.

Referring to FIG. 20, another technique of calculating the horizontal pixel displacements is illustrated with three different pixel depths, a pixel at a depth position behind the screen versus a couple pixels positions in front of the screen. Unlike the previous technique where depth and popout are independent of a viewers somewhat independent of a viewers distance from the display screen, this modified technique offers popout and depth which are proportionally relative to the viewers distance from the display screen. This improves the 3D experience for a viewer that is further from the display screen.

With a pair of eyes of a viewer at a given distance apart and at a given distance from the screen, the displacement of the pixels displayed on the screen may be illustrated as S1. However, when the pixel is illustrated at a depth in front of the screen, the pixel shifts reverse for the eyes and the shift of the pixels for being displayed on the screen may be illustrated as S2. As it may be observed, the distance of the shift on the screen varies with the depth behind the display and the depth in front of the display. In addition, the shift in the pixel distances should be based upon the distance between the eyes of the viewer. In this manner, it may be observed that with increasing depth behind the display the shift behind S1 tends to vary from the displacement being substantially equal to the distance between the eyes of the viewer (at a distance behind the display nearing infinity) to a displacement of zero with the distance at the display. In this manner, it may be observed that with increasing depth in front of the display the displacement in front S2 tends to vary from the displacement being zero with the distance in front of the display being equal to zero to a substantial displacement that increases substantially as the shift gets increasingly closer to the viewing plane. It may be observed, that the shift behind S1 for changes in depth behind the display results in relatively minor shifts compared to the corresponding shifts S2 for changes in the depth in front of the display. Accordingly, the depth map and/or rendering should account for the differences in the rendering with respect to the distance between the eyes of the viewer and the distance that the viewer is from the display screen. This creates a yet more realistic 3D geometries and can facilitate a greater 3D pop-out effect in front of the display. Moreover, with increasingly greater change in the depth in front of the display, the shift in front S3 tends to vary at an ever increasing manner such that even a minor z axis offset in front of the display results in a substantial displacement of the pixels.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method for conversion of a series of two dimensional images using a processor into a series of three dimensional images comprising:
(a) said processor receiving said series of two dimensional images where each of said series of two dimensional images are from a same viewpoint, where said series of two dimensional images do not include any images from a viewpoint other than said same viewpoint;
(b) said processor processing said series of two dimensional images all of which are from said same viewpoint and do not include any images from a viewpoint other than said same viewpoint to determine a respective depth map associated with each pixel or clusters of pixels of said series of two dimensional images where all of said series of two dimensional images are from said same viewpoint, where said series of two dimensional images do not include any images from a viewpoint other than said same viewpoint;
(c) said processor processing said depth map depths to create corresponding source pixel horizontal displacements for each eye-view to be rendered for a target glasses-based or glasses-free 3D or holographic display;
(d) said processor displacing the pixels to create a fully or partially populated image for each view, wherein portions of said series of three dimensional images has an appearance of being behind a plane of a screen of said display and other portions of said series of three dimensional images has the appearance of being in front of said plane of said screen of said display, where a first depth of a first pixel of said depth map being a first distance behind of said plane of said display screen results in a first displacement of said pixel on said display, where a second depth of a second pixel of said depth map being a second distance in front of said plane of said screen of said display results in a second displacement of said pixel on said display, wherein said first depth is the same as said second depth from said plane of said screen, where said second displacement is greater than said first displacement;
(e) rendering said three dimensional images based upon said two dimensional images all of which are from the same viewpoint and do not include any images from a viewpoint other than said same viewpoint on a display; and
(f) wherein as said second depth becomes increasingly larger, wherein a second shift becomes increasingly larger in a non-linear manner.

* * * * *

UNITED STATES PATENT AND TRADEMARK OFFICE
CERTIFICATE OF CORRECTION

PATENT NO. : 10,277,879 B2
APPLICATION NO. : 15/293433
DATED : April 30, 2019
INVENTOR(S) : Craig Peterson Page 1 of 1

It is certified that error appears in the above-identified patent and that said Letters Patent is hereby corrected as shown below:

In the Specification

Column 1, Line 57: Change "there dimensional content" to --three dimensional content--.

Signed and Sealed this
Fourth Day of August, 2020

Andrei Iancu
*Director of the United States Patent and Trademark Office*